United States Patent
Hosomi

(10) Patent No.: US 12,141,206 B2
(45) Date of Patent: Nov. 12, 2024

(54) INFORMATION SEARCH APPARATUS, INFORMATION SEARCH METHOD, AND COMPUTER-READABLE RECORDING MEDIUM

(71) Applicant: NEC Corporation, Tokyo (JP)

(72) Inventor: Itaru Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/009,857

(22) PCT Filed: Jun. 16, 2020

(86) PCT No.: PCT/JP2020/023650
§ 371 (c)(1),
(2) Date: Dec. 12, 2022

(87) PCT Pub. No.: WO2021/255841
PCT Pub. Date: Dec. 23, 2021

(65) Prior Publication Data
US 2023/0297620 A1    Sep. 21, 2023

(51) Int. Cl.
*G06F 16/00*     (2019.01)
*G06F 16/901*    (2019.01)
(Continued)

(52) U.S. Cl.
CPC ...... *G06F 16/9032* (2019.01); *G06F 16/9027* (2019.01); *G06F 16/90335* (2019.01); *G06F 16/906* (2019.01); *G06N 5/046* (2013.01)

(58) Field of Classification Search
None
See application file for complete search history.

(56) References Cited

U.S. PATENT DOCUMENTS 9,298,854 B2 *   3/2016   Ikawa .................. G06F 16/2477
10,169,720 B2 *  1/2019   Chien .................... G06F 16/285
(Continued)

FOREIGN PATENT DOCUMENTS

| JP | 2002-297387 A | 10/2002 |
| JP | 2007-519069 A | 7/2007 |
| WO | 2015/059791 A1 | 4/2015 |

OTHER PUBLICATIONS

International Search Report for PCT Application No. PCT/JP2020/023650, mailed on Jul. 21, 2020.
(Continued)

*Primary Examiner* — Debbie M Le
(74) *Attorney, Agent, or Firm* — Michael Dryja

(57) ABSTRACT

The information search apparatus 100 includes: a logical inference unit 10 that executes a logical inference by applying a rule indicating a relationship between occurrences to a set of data indicating observed occurrences, and generates data of a series of occurrences through the logical inference; a query generation unit 20 that determines a condition for extracting data related to the series of occurrences from the set of data indicating observed occurrences based on the data of the series of occurrences and the rule indicating a relationship between occurrences, and generates a query using the condition determined; and a data search unit 30 that executes search processing on the set of data indicating observed occurrences using the query generated.

15 Claims, 15 Drawing Sheets

(51) Int. Cl.
   *G06F 16/903*     (2019.01)
   *G06F 16/9032*    (2019.01)
   *G06F 16/906*     (2019.01)
   *G06N 5/046*      (2023.01)

(56) References Cited

U.S. PATENT DOCUMENTS

| | | | | |
|---|---|---|---|---|
| 11,016,730 B2 * | 5/2021 | Altshuller | ............... | G06N 20/00 |
| 11,176,109 B2 * | 11/2021 | Kholodkov | ............... | H03M 7/46 |
| 11,204,847 B2 * | 12/2021 | Nie | ......................... | G06N 20/20 |
| 11,580,164 B1 * | 2/2023 | Falco | .................... | G06F 16/338 |
| 11,748,321 B2 * | 9/2023 | Kholodkov | ........... | G06F 21/552 |
| | | | | 707/693 |
| 2005/0080795 A1 | 4/2005 | Kapur et al. | | |
| 2016/0239661 A1 | 8/2016 | Kawauchi | | |

OTHER PUBLICATIONS

English translation of Written opinion for PCT Application No. PCT/JP2020/023650, mailed on Jul. 21, 2020.

\* cited by examiner

Fig.4
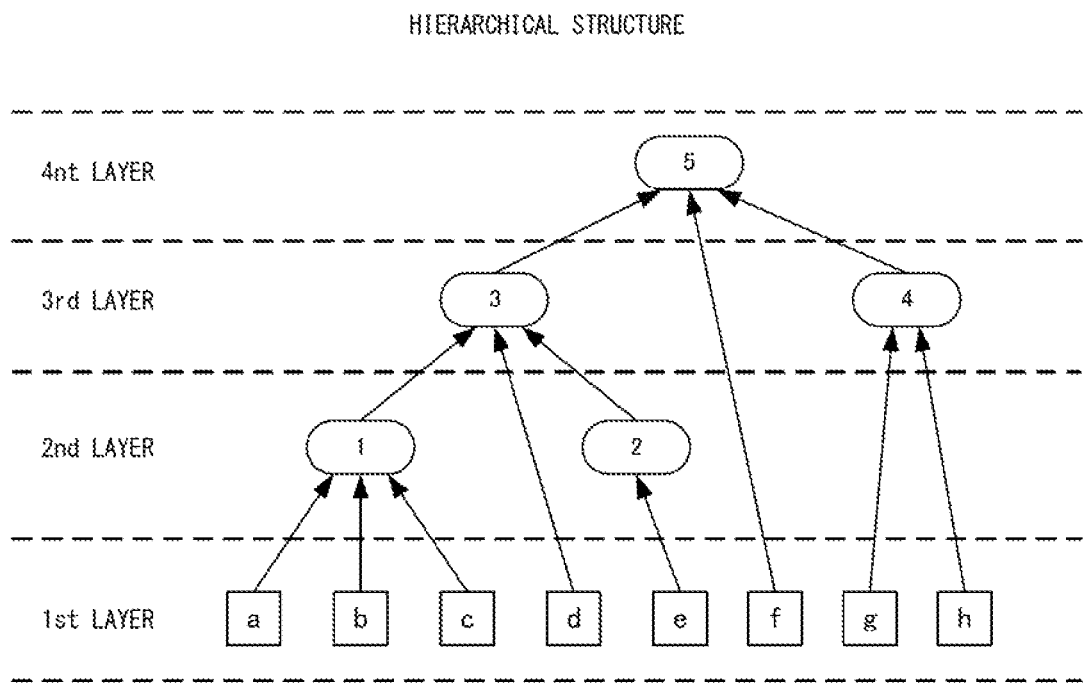
HIERARCHICAL STRUCTURE
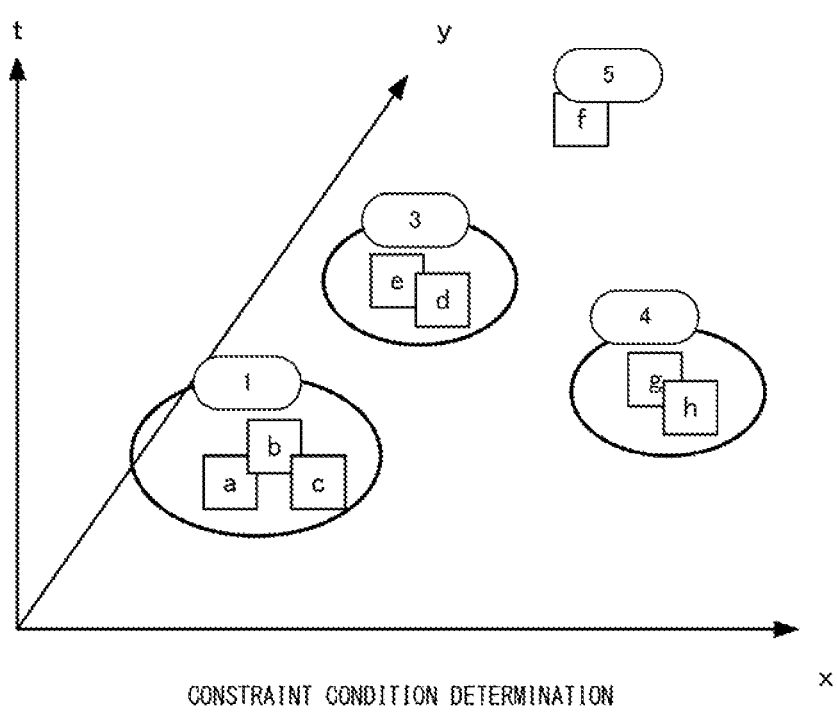
CONSTRAINT CONDITION DETERMINATION

Fig.6

| | |
|---|---|
| OBSERVED OCCURRENCE DATA | emailReceived( "10:21:35" , "host1" , "hoge" )<br>openFile( "10:23:18" , "host1" , "notification.pdf" )<br>exeFileCreated( "10:23:21" , "host1" , "ImVerySafe.exe" )<br>remoteLogon( "23:29:04" , "host1" , "host2" )<br>remoteLogon( "23:30:05" , "host1" , "host5" )<br>exeFileCreated( "23:39:52" , "host2" , "ImVerySafe.exe" )<br><br>isUnknownSender( "hoge" , "fool@example.com" )<br>hasAttachedFile( "hoge" , "notification.pdf" )<br>vulnerableProgramExecuted( "10:23:19" , "host1" , "hogePDF.exe" )<br>isAbnormalWorkTime( "23:29:04" )<br>isAbnormalWorkTime( "23:30:05" ) |
| RULES | 1. emailReceived(time, host, emailId) ^ isUnknownSender(emailId, sender) ^<br>    hasAttachedFile(emailId, file) ⇒ suspiciousFileReceived(time, host, file)<br>2. vulnerableProgramExecuted(time1, host, program) ^ exeFileCreated(time2, host, file) ⇒ suspiciousExeCreated(time2, host, file)<br>3. suspiciousFileReceived(time1, host, "notification.pdf") ^<br>    openFile(time2, host, file) ^ suspiciousExeCreated(time3, host, file)<br>    ⇒ malwareInjected(time3, host)<br>4. remoteLogon(time, source, dest) ^ isAbnormalWorkTime(time) ⇒<br>    suspiciousLogon(time, source, dest)<br>5. malwareInjected(time1, host1) ^ exeFileCreated(time2, host2, file) ^<br>    suspiciousLogon(time3, host1, host2) ⇒ lateralMovement(time3, host1, host2)<br>6. malwareDetectedByAV(time2, host, data) ⇒ malwareInjected(time2, host)<br>7. taskScheduled(time1, source, task) ^ hasExternalHostInTask(time1, host2, task) ⇒ lateralMovement(time1, host1, host2) |

Fig.7

```
HYPOTHESES
① emailReceived( "10:21:35" , "host1" , "hoge" ) ^ isUnknownSender( "hoge" , "foo1@example.com" )
  ^ hasAttachedFile( "hoge" , "notification.pdf" ) ⇒ suspiciousFileReceived ( "10:21:35" , "host1" ,
  "notification.pdf" )

② vulnerableProgramExecuted( "10:23:19" , "host1" , "hogePDF.exe" ) ^ exeFileCreated( "10:23:21" ,
  "host1" , "ImVerySafe.exe" ) ⇒ suspiciousExeCreated( "10:23:21" , "host1" , "ImVerySafe.exe" )

③ suspiciousFileReceived( "10:21:35" , "host1" , "notification.pdf" ) ^ openFile( "10:23:18" ,
  "host1" , "notification.pdf" ) ^ suspiciousExeCreated( "10:23:21" , "host1" , "ImVerySafe.exe" )
  ⇒ malwareInjected( "10:23:21" , "host1" )

④ remoteLogon( "23:29:04" , "host1" , "host2" ) ^ isAbnormalWorkTime( "23:29:04" ) ⇒
  suspiciousLogon( "23:29:04" , "host1" , "host2" )

⑤ malwareInjected( "10:23:18" , "host1" ) ^ exeFileCreated( "23:39:52" , "host2" ,
  "ImVerySafe.exe" ) ^ suspiciousLogon( "23:29:04" , "host1" , "host2" ) ⇒
  lateralMovement( "23:29:04" , "host1" , "host2" )
```

Fig.9

```
QUERY
// QUERY for data retrieval about malwareInjected
SELECT emailReceived($time1, $host1, $emailId1), isUnknownSender($emailId1, $sender1),
    hasAttachedFile($emailId1, $file1), openFile($time2, $host1, $file1), exeFileCreated($time3,
    $host1, $file2), vulnerableProgramExecuted($time4, $host1, $program1)
WHERE $time1 BETWEEN "10:21:35" - 100 AND "10:23:21" + 100
AND    $time2 BETWEEN "10:21:35" - 100 AND "10:23:21" + 100
AND    $time3 BETWEEN "10:21:35" - 100 AND "10:23:21" + 100

// QUERY for data retrieval about suspiciousLogon
SELECT remoteLogon($time1, $host1), isAbnormalWorkTime($time1)
WHERE $time1 BETWEEN "23:29:04" - 100 AND "23:29:04" + 100

// QUERY for data retrieval about lateralMovement
SELECT malwareInjected($time1, $host1), exeFileCreated($time2, $host2, $file1),
    suspiciousLogon($time3, $host1, $host2)
WHERE $time1 BETWEEN "10:23:21" - 100 AND "10:23:21" + 100
AND    $time2 BETWEEN "23:29:52" - 100 AND "23:29:52" + 100
AND    $time3 BETWEEN "23:29:04" - 100 AND "23:29:04" + 100
```

Fig.10

| OCCURRENCE TO BE ESATABISHED | DATA THAT SERVE AS BASIS FOR LEFT SIDE OCCURRENCE (SEARCH RESULTS) |
|---|---|
| malwareInjected | emailReceived( "hoge" , "10:21:35" , "host1" ), <br> isUnknownSender( "hoge" , "foo@example.com" ), <br> hasAttachedFile( "hoge" , ".pdf" ), <br> openFile( "10:23:18" , "host1" , "notification.pdf" ), <br> vulnerableProgramExecuted( "10:23:19" , "alice" , "hogePDF.exe" ) <br> exeFileCreated( "10:23:21" , "alice" , "ImVerySafe.exe" ) |
| suspiciousLogon | remoteLogon( "23:29:04" , "host1" , "host2" ), <br> isAbnormalWorkTime( "23:29:04" ) |
|  | remoteLogon( "23:30:05" , "host1" , "host5" ), <br> isAbnormalWorkTime( "23:30:05" ) |
| lateralMovement | malwareInjected( "10:23:18" , "host1" ), <br> exeFileCreated( "23:29:52" , "host2" , "ImVerySafe.exe" ), <br> suspiciousLogon( "23:29:04" , "host1" , "host2" ) |

Fig.13
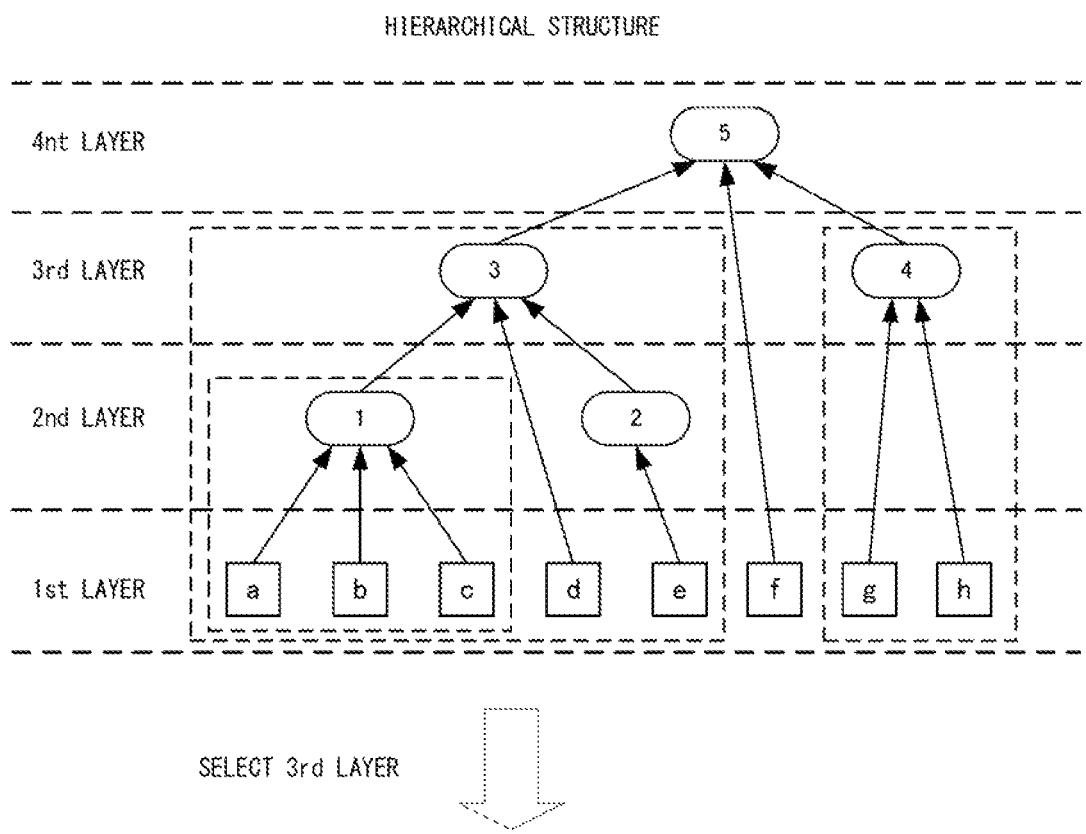
SELECT 3rd LAYER
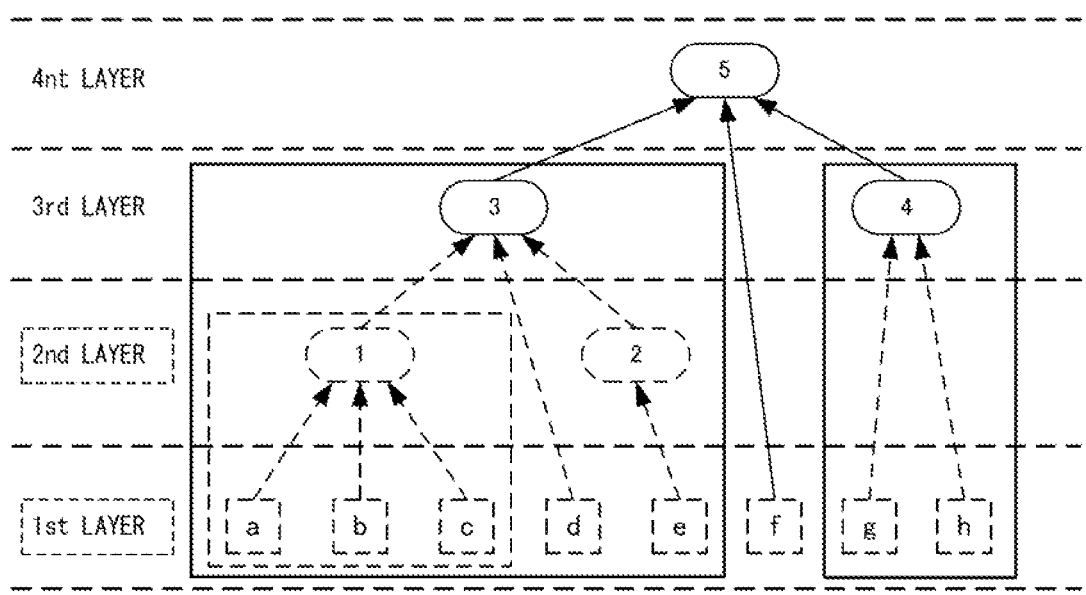

though the logical inference;
INFORMATION SEARCH APPARATUS, INFORMATION SEARCH METHOD, AND COMPUTER-READABLE RECORDING MEDIUM This application is a National Stage Entry of PCT/JP2020/023650 filed on Jun. 16, 2020, the contents of all of which are incorporated herein by reference, in their entirety.

TECHNICAL FIELD

The present invention relates to an information search apparatus and an information search method for searching for necessary information from a data set, and further relates to a computer-readable recording medium having recorded thereon a program for realizing the same.

BACKGROUND ART

Search systems normally perform searches using only user-entered queries (search keyword sets), which limits the extent to which the search accuracy can be improved. In response to this, Patent Document 1 proposes a search system that outputs search results that are closer to a concept a user has in mind.

The search system disclosed in Patent Document 1 extends or improves a query using a conceptual network defining various relationships between words, or in other words, knowledge data expressing relationships between entities in the real world, and performs a search using the extended or improved query.

LIST OF RELATED ART DOCUMENTS

Patent Document

Patent Document 1: Japanese Patent Laid-Open Publication No. 2007-519069 SUMMARY OF INVENTION

Problems to be Solved by the Invention

Incidentally, in recent years, there is, depending on the field, demand for a search system to exhaustively extract data related to a series of occurrences from a set of data that have potential relationships with each other. For example, in the analysis of cyber attacks, there is demand for a search system to exhaustively extract traces of the attacker's activities from a database in which a set of computer system logs are accumulated.

A possible method to enable such extraction is to give a query that describes a relationship among data to the database to be searched, taking into account unknown data to be obtained in the future.

However, since it is difficult to describe the relationship between data in a query, it is difficult, even for the data search system disclosed in Patent Document 1, to exhaustively extract data related to a series of occurrences from a set of data that have potential relationships with each other.

An example object of the present invention is to provide an information search apparatus, an information search method, and a computer-readable recording medium that can solve the above-described problem and exhaustively extract data related to a series of occurrences from a data set having potential relationships with each other.

Means for Solving the Problems

In order to achieve the above-described object, an information search apparatus includes:

a logical inference unit that executes a logical inference by applying a rule indicating a relationship between occurrences to a set of data indicating observed occurrences, and generates data of a series of occurrences through the logical inference;

a query generation unit that determines a condition for extracting data related to the series of occurrences from the set of data indicating observed occurrences based on the data of the series of occurrences and the rule indicating a relationship between occurrences, and generates a query using the condition determined; and a data search unit that executes search processing on the set of data indicating observed occurrences using the query generated.

In addition, in order to achieve the above-described object, an information search method includes:

a logical inference step of executing a logical inference by applying a rule indicating a relationship between occurrences to a set of data indicating observed occurrences, and generating data of a series of occurrences through the logical inference;

a query generation step of determining a condition for extracting data related to the series of occurrences from the set of data indicating observed occurrences based on the data of the series of occurrences and the rule indicating a relationship between occurrences, and generating a query using the condition determined; and a data search step of executing search processing on the set of data indicating observed occurrences using the query generated.

Furthermore, in order to achieve the above-described object, a computer readable recording medium according to an example aspect of the invention is a computer readable recording medium that includes recorded thereon a program, the program including instructions that cause the computer to carry out:

a logical inference step of executing a logical inference by applying a rule indicating a relationship between occurrences to a set of data indicating observed occurrences, and generating data of a series of occurrences through the logical inference;

a query generation step of determining a condition for extracting data related to the series of occurrences from the set of data indicating observed occurrences based on the data of the series of occurrences and the rule indicating a relationship between occurrences, and generating a query using the condition determined; and a data search step of executing search processing on the set of data indicating observed occurrences using the query generated.

Advantageous Effects of the Invention

As described above, according to the invention, it is possible to exhaustively extract data related to a series of occurrences from a data set having potential relationships with each other.

BRIEF DESCRIPTION OF THE DRAWINGS

FIG. 4 is a diagram schematically illustrating the process of query generation performed in the first example embodiment.

FIG. 6 is a diagram illustrating an example of the observed occurrence data and the rules indicating the relationship between occurrences, used in the first example embodiment.

FIG. 7 is a diagram illustrating an example of hypotheses generated by the abductive inference in the first example embodiment.

FIG. 9 is a diagram illustrating an example of a query created in the first example embodiment.

FIG. 10 is a diagram illustrating an example of the result of the search processing according to the first example embodiment.

FIG. 13 is a diagram illustrating an example of the grouping performed in the second example embodiment.

EXAMPLE EMBODIMENTS

First Example Embodiment

Figure 1:
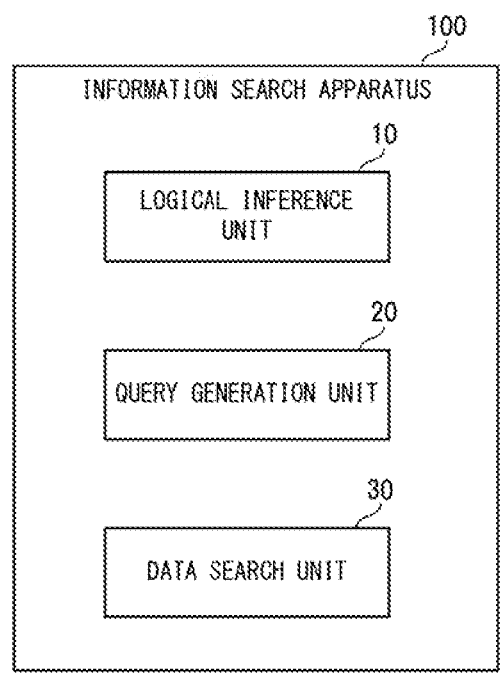
FIG. 1 is a block diagram illustrating the overall configuration of the information search apparatus according to the first example embodiment.

An information search apparatus, an information search method, and a program according to a first example embodiment will be described hereinafter with reference to FIGS. 1 to 11.
Apparatus Configuration First, the overall configuration of the information search apparatus according to the first example embodiment will be described with reference to FIG. 1. FIG. 1 is a block diagram illustrating the overall configuration of the information search apparatus according to the first example embodiment.

An information search apparatus 100 in the first example embodiment, illustrated in FIG. 1, is an apparatus for searching for necessary information from a data set. As illustrated in FIG. 1, the information search apparatus 100 includes a logical inference unit 10, a query generation unit 20, and a data search unit 30.

The logical inference unit 10 executes a logical inference by applying rules, which indicate relationships between occurrences, to a set of data indicating observed occurrences (called "observed occurrence data" hereinafter), and generates data of a series of occurrences through the logical inference.

The query generation unit 20 determines conditions for extracting data related to a series of occurrences from a set of observed occurrence data based on data of the series of occurrences, generated by the logical inference unit 10, and the rules indicating relationships among the occurrences (called "data extraction conditions" hereinafter). The query generation unit 20 then generates a query using the determined conditions.

The data search unit 30 executes search processing on the set of observed occurrence data using the query generated by the query generation unit 20.

In this manner, in the first example embodiment, logical inference is first performed to generate data on a series of occurrences. This generated data provides clues to identify a series of occurrences related to each other, and queries are generated from this data. Therefore, according to the first example embodiment, it is possible to exhaustively extract data related to a series of occurrences from a set of data that have a potential relationship with each other.

Figure 2:
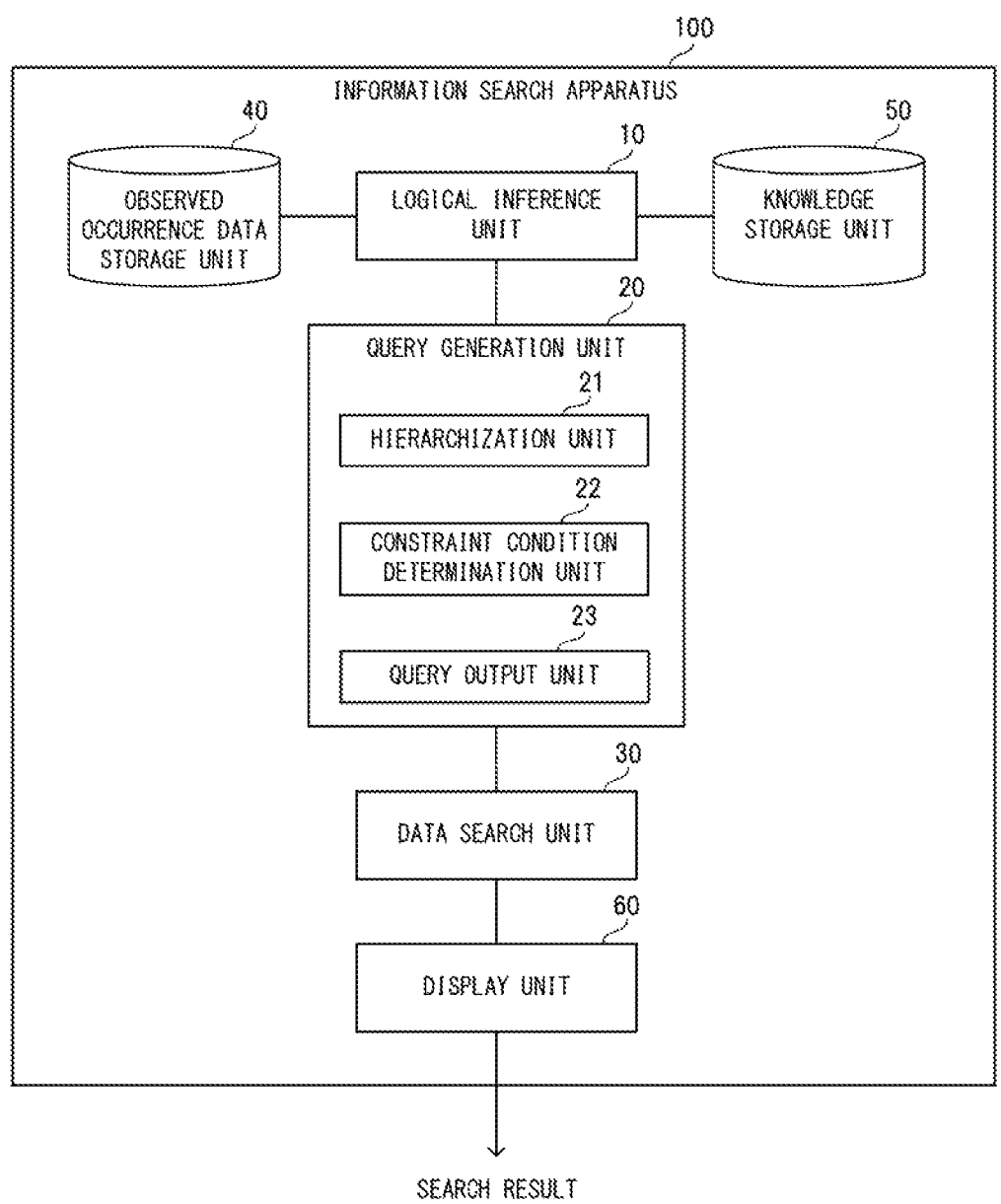
FIG. 2 is a block diagram illustrating the configuration of the information search apparatus according to the first example embodiment in detail.

The configuration and functions of the information search apparatus according to the first example embodiment will be described in detail next with reference to FIGS. 2 to 4. FIG. 2 is a block diagram illustrating the configuration of the information search apparatus according to the first example embodiment in detail.

As illustrated in FIG. 2, in addition to the logical inference unit 10, the query generation unit 20, and the data search unit 30 described above, the information search apparatus 100 of the first example embodiment includes an observed occurrence data storage unit 40, a knowledge storage unit 50, and a display unit 60. The observed occurrence data storage unit 40 and the knowledge storage unit 50 are databases and may be constructed by a storage device of a computer connected to the information search apparatus 100 over a network.

The observed occurrence data storage unit 40 stores observed occurrence data. In the first example embodiment, the observed occurrence data includes the name of an occurrence as well as the date/time and location where the occurrence occurred or was observed.

The knowledge storage unit 50 stores rules indicating relationships between occurrences (hereinafter also referred to simply as "rules"). In the first example embodiment, the rules indicating relationships between occurrences are constituted by a collection of sets of premises expressed as occurrences and consequences corresponding to the premises.

In the first example embodiment, the logical inference unit 10 can execute a abductive inference as the logical inference and generate hypotheses about a series of occurrences as the data about the series of occurrences. Abductive inference can be realized by implementing an abductive inference engine, such as, for example, Open-David (see https://github.com/aurtg/open-david, for example). Note that the logical inference unit 10 can also perform deductive inference as the logical inference, for example, rather than abductive inference.

When the logical inference unit 10 performs abductive inference, the query generation unit 20 determines the data extraction conditions based on the hypotheses related to the series of occurrences, which is the data about the series of occurrences, the rules indicating the relationships among the occurrences, the name of each occurrence, and the date/time and location where the occurrence occurred or was observed.

The functions of the query generation unit 20 will be described in more detail here with reference to FIGS. 3 and 4. FIG. 3 schematically illustrates a result of the logical inference performed in the first example embodiment. FIG. 4 schematically illustrates the process of query generation performed in the first example embodiment. As illustrated in FIG. 2, in the first example embodiment, the query generation unit 20 includes a hierarchization unit 21, a constraint condition determination unit 22, and a query output unit 23.

Figure 3:
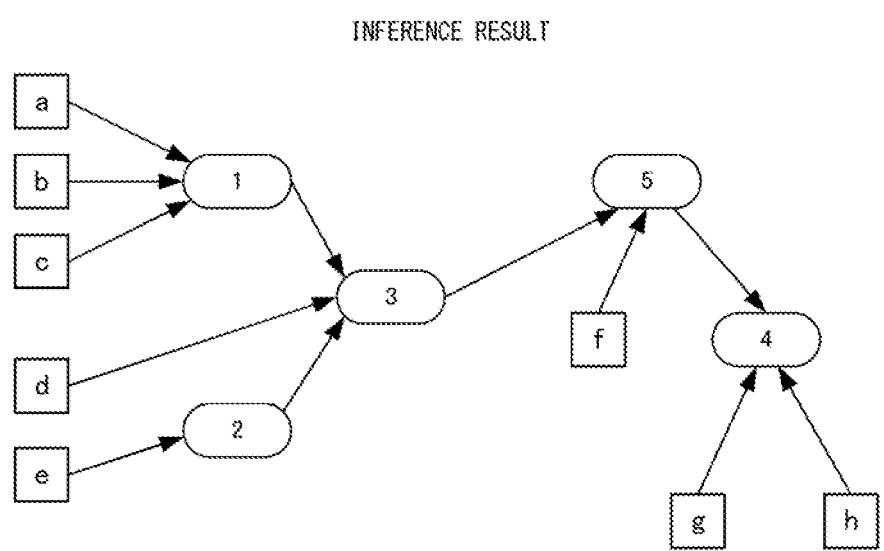
FIG. 3 is a diagram schematically illustrating a result of the logical inference performed in the first example embodiment.

First, the results of the logical inference illustrated in FIG. 3, i.e., the generated hypotheses, are input to the query generation unit 20. In the example in FIG. 3, the hypotheses are illustrated as a directed graph, with arrows indicating the relationships from premises to consequences. In FIG. 3, a to h represent the observed occurrence data, i.e., the parts that express the observed occurrences in the hypothesis, or in other words, the premise. In FIG. 3, 1 to 5 indicate the elements of knowledge in the hypotheses, i.e., the consequences contained in the rules indicating the relationships between the occurrences.

As illustrated in the upper part of FIG. 4, the hierarchization unit 21 constructs a hierarchical structure of the occurrences by setting the lowest layer as the parts a to h that express the observed occurrences in the hypothesis, and by setting the layers of occurrences above the lowest layer in the hierarchy by using the consequences 1 to 5 included in the rules indicating the relationships between the occurrences. After setting the lowest layer, the hierarchization unit 21 determines the elements that will be the highest layer, and then determines the elements that will be the intermediate layer of the occurrences based on distances (numbers of connections) from the highest layer.

The constraint condition determination unit 22 classifies the occurrences constituting the hierarchical structure into a plurality of groups based on the date/time and location included in the set of the observed occurrence data, as illustrated in the lower part of FIG. 4. In the example in the lower part of FIG. 4, the constraint condition determination unit 22 groups the lower elements (the observed occurrence data) a to h, which overlap in terms of time (t±α) and location (x±β, y±γ), with common higher elements (rule consequences) 1 to 5. Note that α, β, and γ above are thresholds that define ranges recognized as corresponding to overlap. Times or locations are determined to overlap if they are within the threshold.

If there are a plurality of groups in which the lower elements have something in common other than the time and the location, and there is a connection between the higher elements of each of these common lower elements, the constraint condition determination unit 22 further groups the plurality of groups together. In the example in the lower part of FIG. 4, the lower element d and the lower element e have everything in common except the time and the location, and the higher element 3 of d is above the higher element 2 of e. Therefore, the group of 3-d and the group of 2-e are merged into a single group.

Then, for each group, the constraint condition determination unit 22 determines conditions for extracting data related to a series of occurrences from the set of observed occurrence data, using the names, dates/times, and locations of the occurrences included in each group.

Specifically, the constraint condition determination unit 22 extracts, for each group, the names, dates/times, and locations of the occurrences included in each of the groups. Next, the constraint condition determination unit 22 determines the extracted occurrence names, dates/times, and locations (i.e., the premises of the rules for which the higher elements are consequences) as the conditions for extracting data related to the series of occurrences from the set of observed occurrence data.

The query output unit 23 generates a query written in a predetermined format using the conditions determined by the constraint condition determination unit 22, and outputs the generated query. The predetermined format may be any format that can be used with the database to be searched (in the first example embodiment, the observed occurrence data storage unit 40).

In the first example embodiment, the data search unit 30 uses the query output by the query output unit 23 to execute search processing on the set of the observed occurrence data stored in the observed occurrence data storage unit 40.

The display unit 60 outputs a search result obtained by the data search unit 30 to a display device or a terminal device. As a result, the search result is displayed on the screen of the display device or on the screen of a display device provided in the terminal device.

Apparatus Operations

Figure 5:
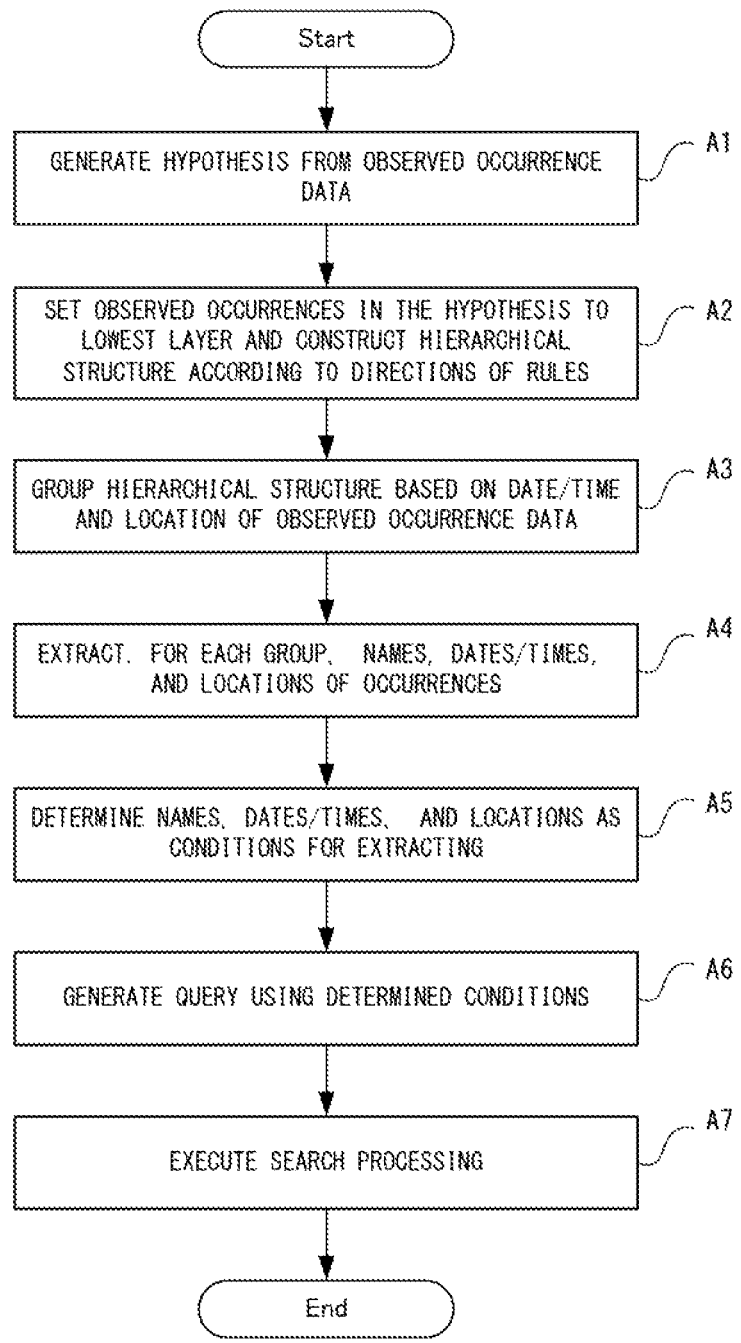
FIG. 5 is a flowchart illustrating operations of the information search apparatus according to the first example embodiment.

Next, operations of the information search apparatus 100 according to the first example embodiment will be described with reference to FIG. 5. FIG. 5 is a flowchart illustrating operations of the information search apparatus according to the first example embodiment. The following descriptions will refer to FIGS. 1 to 4 as appropriate. In addition, in the first example embodiment, an information search method is implemented by operating the information search apparatus 100. As such, the following descriptions of the operations of the information search apparatus 100 will be given in place of descriptions of the information search method according to the present example embodiment.

As illustrated in FIG. 5, first, the logical inference unit 10 applies the rules stored in the knowledge storage unit 50 to the set of the observed occurrence data stored in the observed occurrence data storage unit 40, executes abductive inference, and generates hypotheses about a series of occurrences (step A1).

Next, in the query generation unit 20, the hierarchization unit 21 sets the lowest layer as the parts that express the observed occurrences in the hypothesis, and sets the layers of occurrences above the lowest layer by using the consequences included in the rules indicating the relationships between the occurrences. Then, the query generation unit 20 constructs a hierarchical structure (a tree structure) of the occurrences according to the directions of the rules (premises→consequences) (step A2).

Next, in the query generation unit 20, the constraint condition determination unit 22 classifies the occurrences constituting the hierarchical structure into a plurality of groups based on the date/time and location included in the set of the observed occurrence data, as illustrated in the lower part of FIG. 4 (step A3).

Next, the constraint condition determination unit 22 extracts, for each group, the names, dates/times, and locations of the occurrences included in each of the groups (step A4).

Next, the constraint condition determination unit 22 determines the extracted occurrence names, dates/times, and locations as the conditions for extracting data related to the series of occurrences from the set of observed occurrence data (step A5).

Next, the query output unit 23 generates a query written in a predetermined format using the determined conditions, and outputs the generated query to the data search unit 30 (step A6).

Next, the data search unit 30 uses the query output by the query generation unit 20 to execute search processing on the set of the observed occurrence data stored in the observed occurrence data storage unit 40 (step A7).

After executing step A7, the display unit 60 outputs a search result obtained by the data search unit 30 to a display device or a terminal device, and causes the search result to be displayed in a screen thereof.

Specific Example

A specific example in the first example embodiment will be described next with reference to FIGS. 6 through 10, following each of the steps illustrated in FIG. 5. FIG. 6 illustrates an example of the observed occurrence data and the rules indicating the relationship between occurrences, used in the first example embodiment.

In the example in FIG. 6, the observed occurrence data is obtained by converting log data expressing a given event into a first-order predicate logic expression. In addition, rules indicating the relationships between occurrences are generated for a given event.

In step A1, the logical inference unit 10 applies the rules illustrated in FIG. 6 to the set of the observed occurrence data illustrated in FIG. 6, executes the abductive inference, and generate hypotheses about a series of occurrences. The hypotheses generated are illustrated in FIG. 7. FIG. 7 illustrates an example of hypotheses generated by the abductive inference in the first example embodiment.

In step A2, in the query generation unit 20, the hierarchization unit 21 sets the lowest layer of the hierarchical structure of occurrences according to the following parts, which express occurrences in the hypotheses illustrated in FIG. 7.
"hasAttachedFile"
"isUnknownSender"
"emailReceived"
"openFile"
"vulnerableProgramExecuted"
"exeFileCreated"
"isAbnormalWorkTime"
"remoteLogon"

The hierarchization unit 21 also sets the layers above the lowest layer in the hierarchical structure of occurrences using the following consequences contained in the rules indicating the relationships between the occurrences illustrated in FIG. 6.
"suspiciousFileReceived"
"malwareInjected"
"suspiciousExeCreated"
"lateralMovement"
"suspiciousLogon"

Figure 8:
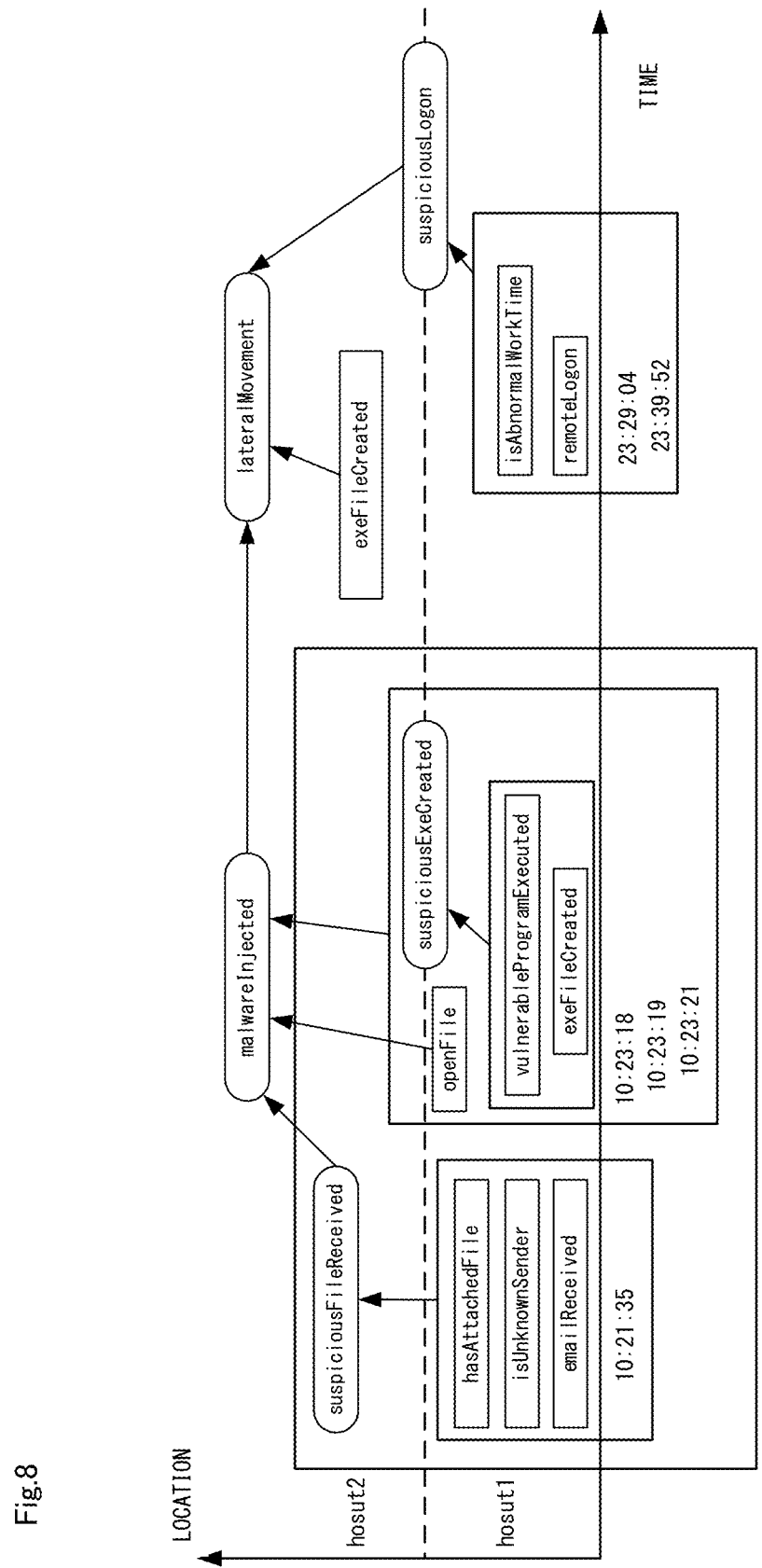
FIG. 8 is a diagram illustrating an example of the grouping performed in the first example embodiment.

In step A3, next, in the query generation unit 20, the constraint condition determination unit 22 classifies the occurrences constituting the hierarchical structure into a plurality of groups based on the date/time and location included in the set of the observed occurrence data, as illustrated in FIG. 8. FIG. 8 is a diagram illustrating an example of the grouping performed in the first example embodiment. In FIG. 8, hierarchical grouping of occurrences is represented by solid line rectangles.

In step A4, the constraint condition determination unit 22 extracts, for each group indicated in FIG. 8, the names, dates/times, and locations of the occurrences included in each of the groups. Then, in step A5, the constraint condition determination unit 22 determines the extracted occurrence names, dates/times, and locations as the conditions for extracting data related to the series of occurrences from the set of observed occurrence data. Furthermore, in step A6, the query output unit 23 generates a query written in a predetermined format using the determined conditions.

The query generated through steps A4 to A6 is illustrated in FIG. 9, for example. FIG. 9 is a diagram illustrating an example of a query created in the first example embodiment. In the example in FIG. 9, "+100" and "−100" indicate values (thresholds) that can be considered to be the same time. The example in FIG. 9 illustrates three queries, namely a query pertaining to malwareInjected, a query pertaining to suspiciousLogon, and a query pertaining to lateralMovement.

In step A7, the data search unit 30 uses the queries illustrated in FIG. 9 to execute search processing on the set of the observed occurrence data stored in the observed occurrence data storage unit 40. The result of the search processing is as illustrated in FIG. 10, and is displayed on the screen by the display unit 60. FIG. 10 is a diagram illustrating an example of the result of the search processing according to the first example embodiment.

In FIG. 10, for each occurrence that is established as a consequence of a rule as a result of the search processing, a set of data that serves as the basis thereof is illustrated. In FIG. 10, "remoteLogon("23:30:05", "host1", "host5"), isAbnormalWorkTime("23:30:05")" is a set which is not included in the results of the abductive inference but are included in the set of observed occurrence data.

Effects of First Example Embodiment

As described above, in the first example embodiment, abductive inference is performed by applying rules to observed occurrence data, and the generated hypotheses serve as clues for identifying a series of occurrences. Conditions for extracting data related to the series of occurrences are derived from the generated hypotheses, and queries are generated from the derived conditions. Therefore, according to the first example embodiment, it is possible to exhaustively extract data related to a series of occurrences from a set of data that have a potential relationship with each other.

Variation

Figure 11:
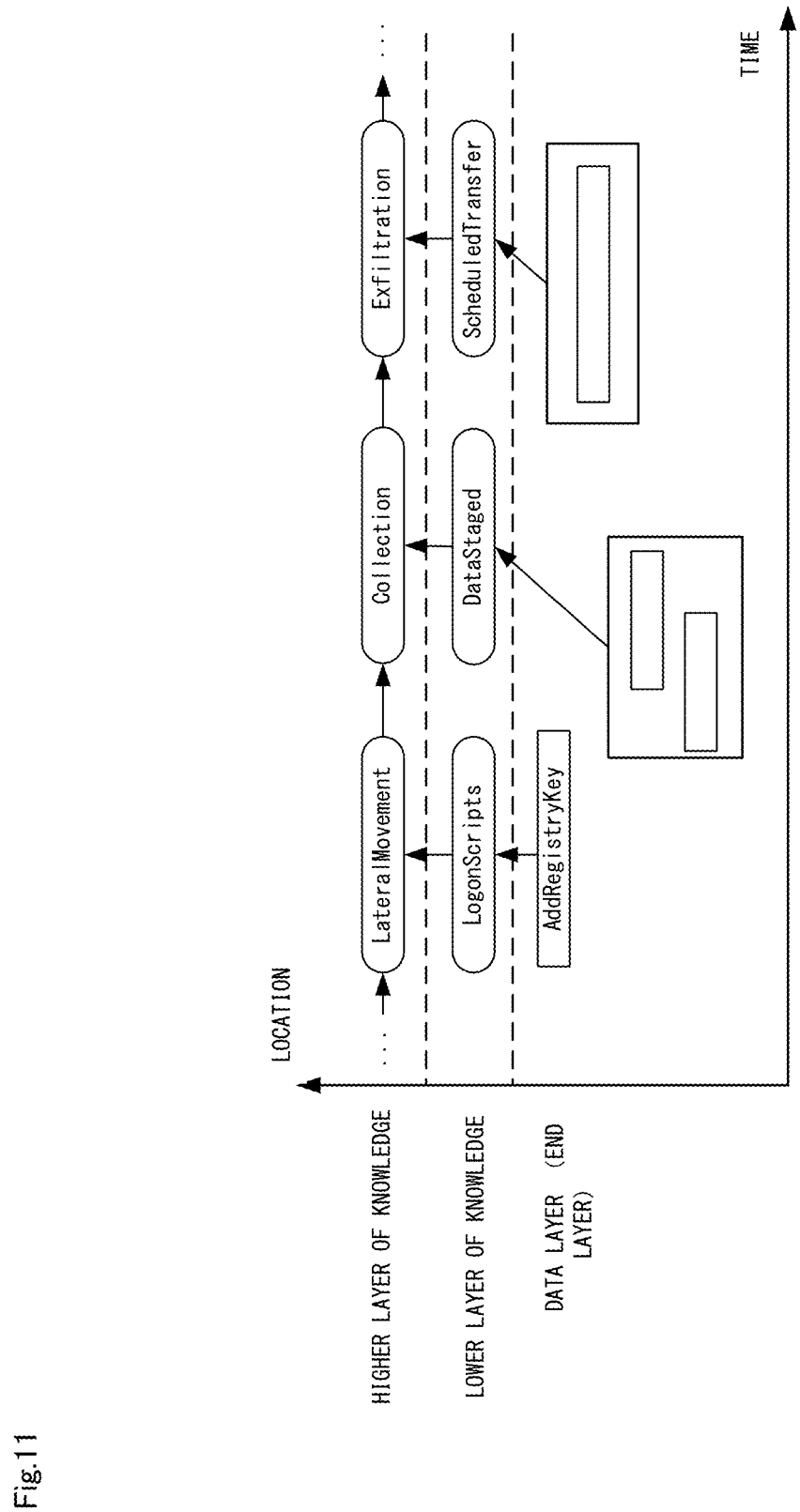
FIG. 11 is a diagram illustrating an example of hypotheses having a hierarchical structure obtained from the hierarchical knowledge in the variation on the first example embodiment.

A variation on the first example embodiment will be described here with reference to FIG. 11. In the variation, in the query generation unit 20, the hierarchization unit 21 constructs a hierarchical structure of occurrences from the hypotheses generated by the logical inference unit based on hierarchical knowledge that has been constructed in advance and stored in the knowledge storage unit 50.

Knowledge having a hierarchical structure, with the various tactics of cyber attacks as the higher layer and the strategies to achieve each tactic as the lower layer, can be given as an example of the hierarchical knowledge. This hierarchical knowledge may also include the specific procedures of each strategy, the tools used in each strategy, methods for detecting attacks using each strategy, and the like. Specifically, MITRE's "ATT&CK Matrix for Enterprise" (see https://attack.mitre.org/) can be given as an example of knowledge having a hierarchical structure. FIG. 11 is a diagram illustrating an example of hypotheses having a hierarchical structure obtained from the hierarchical knowledge in the variation on the first example embodiment.

In the variation as well, the constraint condition determination unit 22 classifies occurrences constituting the hierarchical structure into a plurality of groups based on the date/time and location included in the set of the observed occurrence data, and determines, for each group, the conditions for extracting data related to a series of occurrences from the set of observed occurrence data using the name, date/time, and location of the occurrences included in each group.

In the variation, the query output unit 23 also generates a query written in a predetermined format using the conditions determined by the constraint condition determination unit 22, and outputs the generated query.

In this manner, according to the variation, a hierarchical structure is constructed from hypotheses based on hierarchical knowledge. Accordingly, which occurrence in the hypotheses belongs to which hierarchy is uniquely determined regardless of the result of grouping, which makes it possible for queries to be generated and search results to be displayed according to a constant classification.

Program

It suffices for a program in the first example embodiment to be a program that causes a computer to carry out steps A1 to A7 illustrated in FIG. 5. Also, by this program being installed and executed in the computer, the information search apparatus 100 and the information search method according to the first example embodiment can be realized. In this case, a processor of the computer functions and performs processing as the logical inference unit 10, the query generation unit 20, the data search unit 30 and the display unit 60. The computer includes general-purpose PC, smartphone and tablet-type terminal device.

In the first example embodiment, the observed occurrence data storage unit 40 and the knowledge storage unit 50 may be realized by storing the data files constituting this in a storage device such as a hard disk provided in the computer. Also, the observed occurrence data storage unit 40 and the knowledge storage unit 50 may be realized by a storage device of another computer.

Furthermore, the program according to the first example embodiment may be executed by a computer system constructed with a plurality of computers. In this case, for example, each computer may function as one of the logical inference unit 10, the query generation unit 20, the data search unit 30 and the display unit 60.

Second Example Embodiment

Next, an information search apparatus, an information search method, and a program according to a second example embodiment will be described with reference to FIGS. 12 to 15.

Apparatus Configuration

Figure 12:
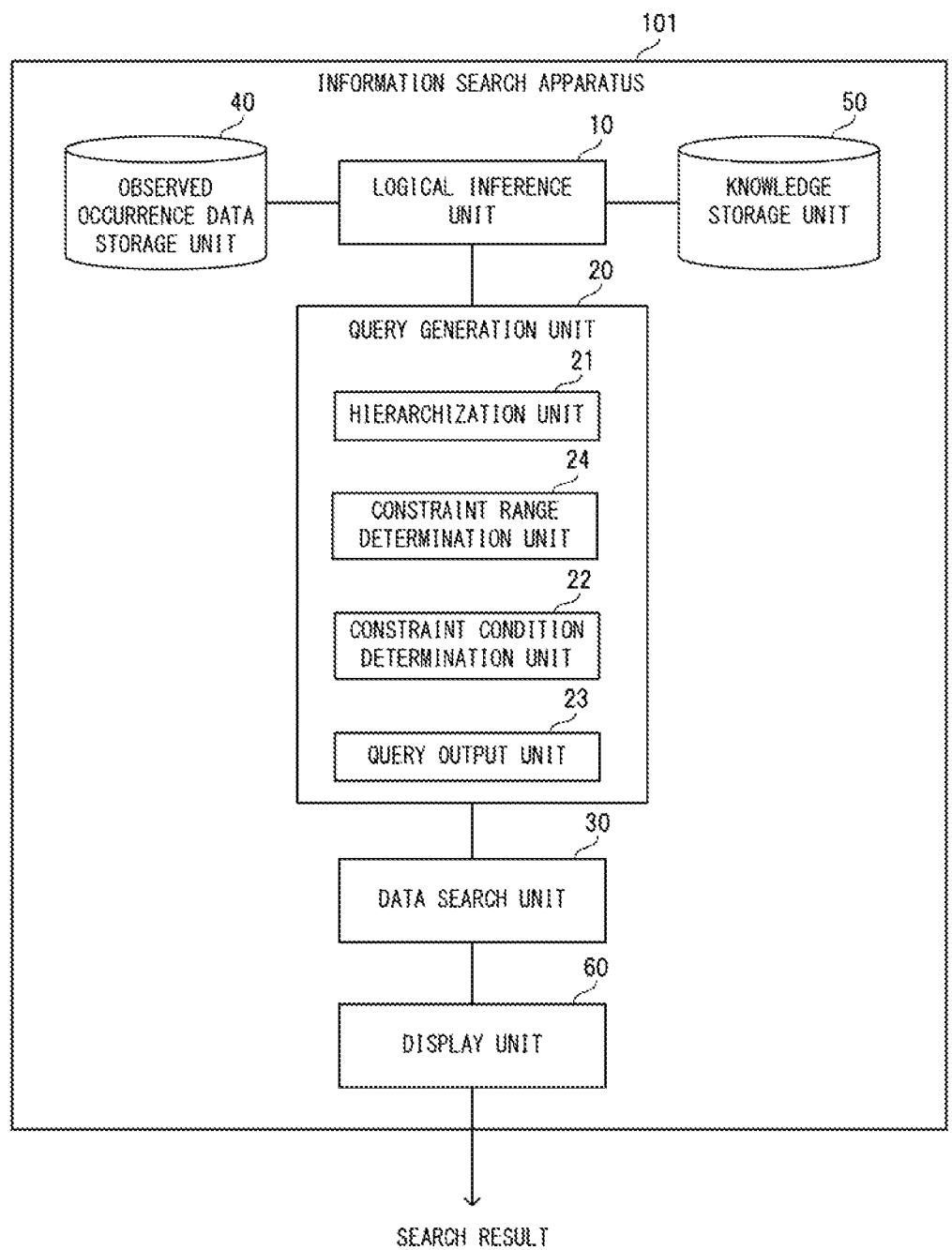
FIG. 12 is a block diagram illustrating the configuration of the information search apparatus according to the second example embodiment.

First, the configuration of the information search apparatus according to the second example embodiment will be described with reference to FIG. 12. FIG. 12 is a block diagram illustrating the configuration of the information search apparatus according to the second example embodiment.

An information search apparatus 101 according to the second example embodiment, illustrated in FIG. 12, is an apparatus for searching for necessary information from a data set, similar to the information search apparatus 100 according to the first example embodiment and illustrated in FIGS. 1 and 2. However, the information search apparatus 101 according to the second example embodiment differs from the information search apparatus 100 according to the first example embodiment in terms of the functions of the query generation unit 20. The following descriptions will focus upon these differences.

As illustrated in FIG. 12, in the information search apparatus 101 according to the second example embodiment, the query generation unit 20 further includes a constraint range determination unit 24 in addition to the hierarchization unit 21, the constraint condition determination unit 22, and the query output unit 23.

The constraint range determination unit 24 determines the layers to be used to determine the conditions for extracting the data related to the series of occurrences from the set of observed occurrence data in the hierarchical structure of occurrences constructed by the hierarchization unit 21.

Specifically, once the hierarchical structure of occurrences has been constructed by the hierarchization unit 21, the constraint range determination unit 24 causes the display unit 60 to display this hierarchical structure on the screen. Then, when an administrator or the like selects a layer using an input device or a terminal device, the constraint range determination unit 24 determines the selected layer and the layers thereabove as the layers to be used for condition determination.

In addition, in the second example embodiment, the constraint condition determination unit 22 divides the determined layer and the layers above the determined layer into a plurality of groups. For example, as illustrated in FIG. 13, when a third hierarchy is selected, the constraint condition determination unit 22 classifies the third hierarchy, and a fourth hierarchy that is thereabove, into a group. FIG. 13 is a diagram illustrating an example of the grouping performed in the second example embodiment.

Then, the constraint condition determination unit 22 obtains the premises of all rules that have the elements ("malwareInjected( . . . )" and "suspiciousLogon ( . . . )", in the example in FIG. 8) of the third hierarchy as consequences, and further obtains the premises of all rules that have each of the acquired premises as consequences. The constraint condition determination unit 22 repeats this procedure until the premises reach the end of the hierarchical structure, and then generates a query based on the premises which are ultimately obtained. The "premises" here are the premises used to derive the consequences by each rule, and the premises which are ultimately obtained serve as the conditions for extracting the data related to a series of occurrences from the set of observed occurrence data.

In this manner, in the second example embodiment, the query is generated having been limited to several layers constituting the hierarchical structure of occurrences. Then, when a query is generated by a lower layer, data consistent with the obtained hypothesis is searched out. When a query is generated by a higher layer, a wide range of data that follows only the rough structure of the obtained hypothesis is searched out.

In the example described above, the constraint range determination unit 24 only imposes constraints on the layers of the hierarchical structure of occurrences, but in the second example embodiment, the data obtained from the hypothesis can also be constrained according to time. In this case, classification into groups is performed and queries are generated using only elements from hypotheses having times that are within the constrained period.

Apparatus Operations

Figure 14:
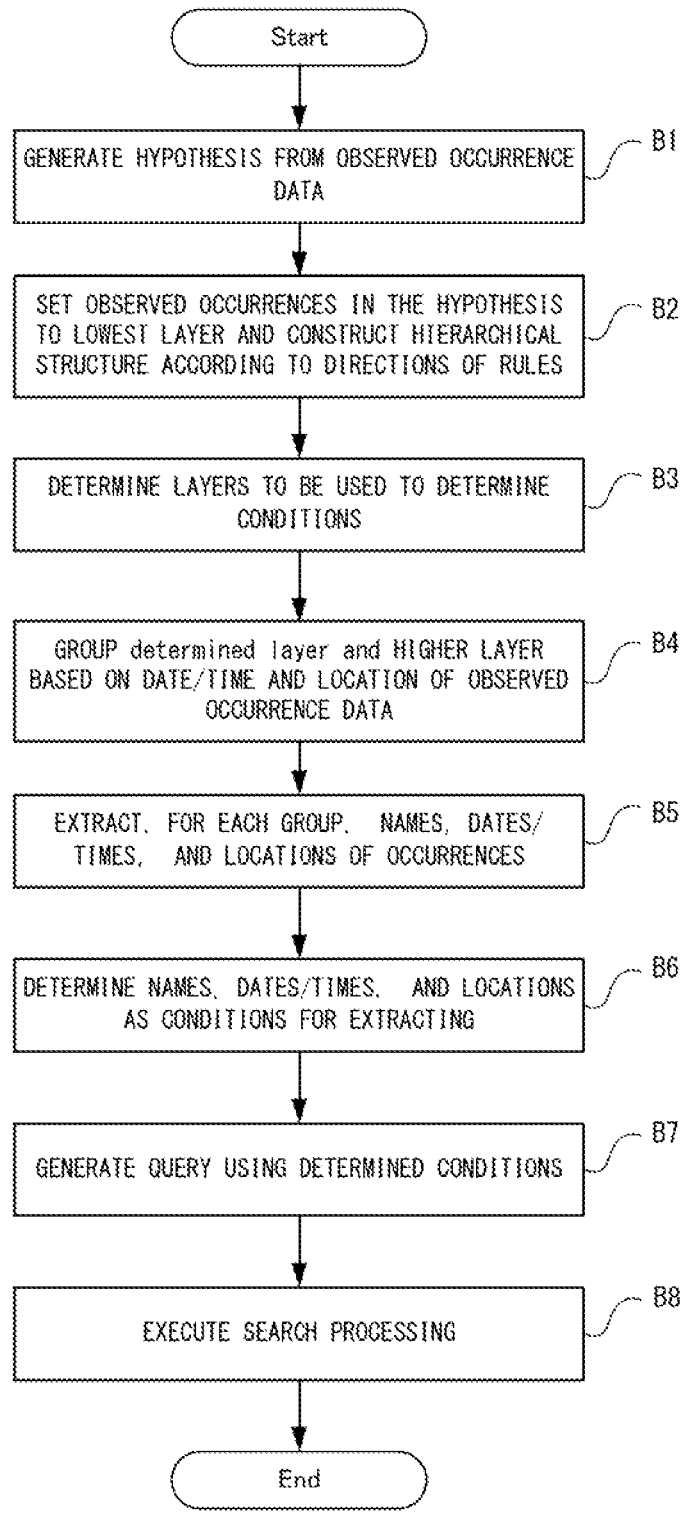
FIG. 14 is a flowchart illustrating operations of the information search apparatus according to the second example embodiment.

Next, operations of the information search apparatus 101 according to the second example embodiment will be described with reference to FIG. 14. FIG. 14 is a flowchart illustrating operations of the information search apparatus according to the second example embodiment.

The following descriptions will refer to FIGS. 12 and 13 as appropriate. In addition, in the second example embodiment, an information search method is implemented by operating the information search apparatus 101. As such, the following descriptions of the operations of the information search apparatus 101 will be given in place of descriptions of the information search method according to the present example embodiment.

As illustrated in FIG. 5, first, the logical inference unit 10 applies the rules stored in the knowledge storage unit 50 to the set of the observed occurrence data stored in the observed occurrence data storage unit 40, executes abductive inference, and generates hypotheses about a series of occurrences (step B1).

Next, in the query generation unit 20, the hierarchization unit 21 constructs a hierarchical structure of occurrences by setting the lowest layer as the parts that express the observed occurrences in the hypothesis, and setting the layers of occurrences above the lowest layer by using the consequences included in the rules indicating the relationships between the occurrences (step B2).

Next, in the query generation unit 20, the constraint range determination unit 24 determines the layers to be used to determine the conditions for extracting the data related to the series of occurrences from the set of observed occurrence data in the hierarchical structure of occurrences constructed in step B2 (step B3).

Next, in the query generation unit 20, the constraint condition determination unit 22 classifies only the layer determined in step B3 and the layers thereabove into a plurality of groups based on the date/time and location included in the set of the observed occurrence data, as illustrated in FIG. 13 (step B4).

Next, the constraint condition determination unit 22 extracts, for each group, the names, dates/times, and locations of the occurrences included in each of the groups (step B5).

Next, the constraint condition determination unit 22 determines the extracted occurrence names, dates/times, and locations as the conditions for extracting data related to the series of occurrences from the set of observed occurrence data (step B6).

Next, the query output unit 23 generates a query written in a predetermined format using the determined conditions, and outputs the generated query to the data search unit 30 (step B7).

Next, the data search unit 30 uses the query output by the query generation unit 20 to execute search processing on the set of the observed occurrence data stored in the observed occurrence data storage unit 40 (step B8).

After executing step B8, the display unit 60 outputs a search result obtained by the data search unit 30 to a display device or a terminal device, and causes the search result to be displayed in a screen thereof.

Effects of Second Example Embodiment

In this manner, in the second example embodiment, queries can be generated with constraints on the hierarchical structure of occurrences. Accordingly, when a query is generated by a lower layer, data consistent with the obtained hypothesis is searched out, whereas when a query is generated by a higher layer, a wide range of data that follows only the rough structure of the obtained hypothesis is searched out. According to the second example embodiment, search results according to the purpose of the person performing the search can be obtained. Additionally, the effects described in the first example embodiment can be achieved by the second example embodiment as well.

Program

It suffices for a program in the second example embodiment to be a program that causes a computer to carry out steps B1 to B8 illustrated in FIG. 14. Also, by this program being installed and executed in the computer, the information search apparatus 101 and the information search method according to the second example embodiment can be realized. In this case, a processor of the computer functions and performs processing as the logical inference unit 10, the query generation unit 20, the data search unit 30 and the display unit 60. The computer includes general-purpose PC, smartphone and tablet-type terminal device.

In the second example embodiment, the observed occurrence data storage unit 40 and the knowledge storage unit 50 may be realized by storing the data files constituting this in a storage device such as a hard disk provided in the computer. Also, the observed occurrence data storage unit 40 and the knowledge storage unit 50 may be realized by a storage device of another computer.

Furthermore, the program according to the second example embodiment may be executed by a computer system constructed with a plurality of computers. In this case, for example, each computer may function as one of the logical inference unit 10, the query generation unit 20, the data search unit 30 and the display unit 60.

Physical Configuration

Figure 15:
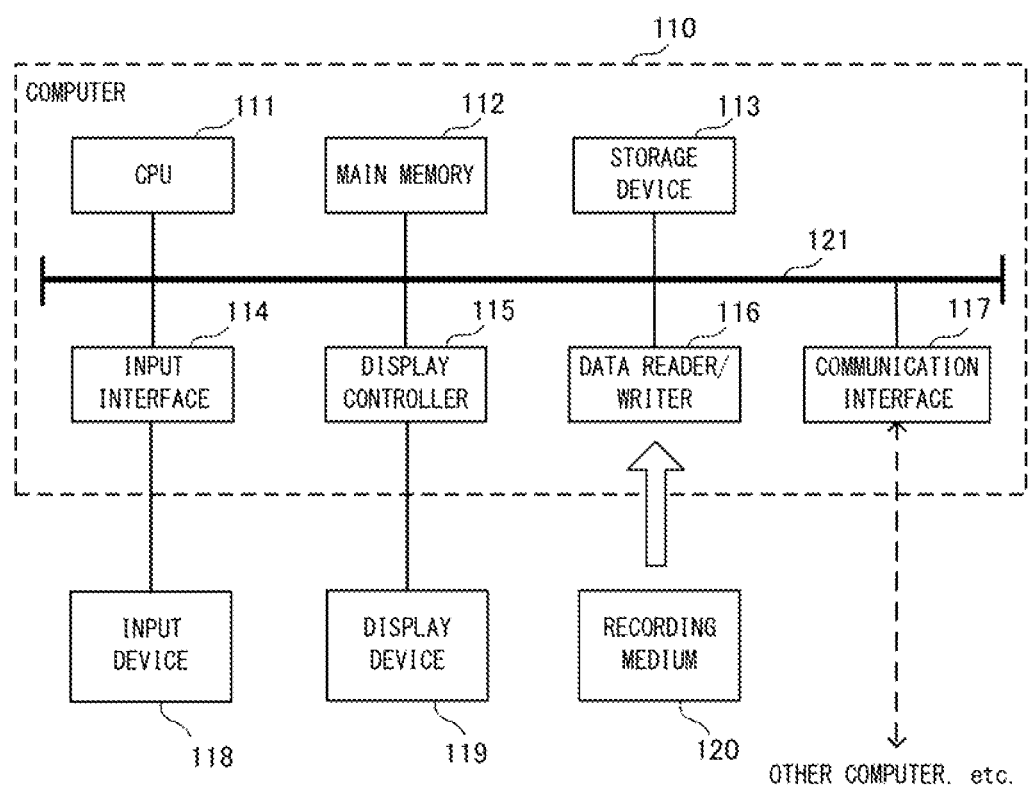
FIG. 15 is a block diagram illustrating an example of a computer that realizes the information search apparatus according to the first and second example embodiment.

Using FIG. 15, the following describes a computer that realizes the information search apparatus by executing the program according to the first and second example embodiment. FIG. is a block diagram illustrating an example of a computer that realizes the information search apparatus according to the first and second example embodiment.

As shown in FIG. 15, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the programs according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the present example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the information search apparatus according to the first and second example embodiment can also be realized by using items of hardware that respectively correspond to the components, rather than the computer in which the program is installed. Furthermore, a part of the information search apparatus may be realized by the program, and the remaining part of the information search apparatus may be realized by hardware.

A part or an entirety of the above-described example embodiment can be represented by (Supplementary Note 1) to (Supplementary Note 15) described below, but is not limited to the description below.

(Supplementary Note 1)

An information search apparatus comprising:
- a logical inference unit that executes a logical inference by applying a rule indicating a relationship between occurrences to a set of data indicating observed occurrences, and generates data of a series of occurrences through the logical inference;
- a query generation unit that determines a condition for extracting data related to the series of occurrences from the set of data indicating observed occurrences based on the data of the series of occurrences and the rule indicating a relationship between occurrences, and generates a query using the condition determined; and
- a data search unit that executes search processing on the set of data indicating observed occurrences using the query generated.

(Supplementary Note 2)

The information search apparatus according to Supplementary Note 1,
- wherein the set of data indicating observed occurrences includes a name of each occurrence, and a date/time and a location where each occurrence occurred or was observed,
- the rule indicating a relationship between occurrences is constituted by a collection of sets of premises expressed as the occurrences and consequences corresponding to the premises,
- the logical inference unit executes abductive inference as the logical inference and generates a hypothesis for the series of occurrences as the data of the series of occurrences, and
- the query generation unit determines the condition based on the hypothesis relating to the series of occurrences as the data of the series of occurrences, the rule indicating a relationship between occurrences, and the name, the date/time, and the location of each of the occurrences.

(Supplementary Note 3)

The information search apparatus according to Supplementary Note 2,
- wherein the query generation unit:
- constructs a hierarchical structure of the occurrences by setting a lowest layer as a part that expresses the observed occurrences in the hypothesis, and setting a layer of occurrences above the lowest layer by using the consequences included in the rule;
- divides the occurrences constituting the hierarchical structure into a plurality of groups based on the dates/times and the locations included in the set of data indicating observed occurrences;
- determines, for each of the groups, a condition for extracting data related to the series of occurrences from the set of data indicating observed occurrences, using the names, dates/times, and locations of the occurrences included in the group; and
- generates the query using the condition determined, the query being written in a predetermined format.

(Supplementary Note 4)

The information search apparatus according to Supplementary Note 2,
- wherein the query generation unit:
- constructs a hierarchical structure of the occurrences from the hypothesis generated, based on hierarchical knowledge constructed in advance;
- divides the occurrences constituting the hierarchical structure into a plurality of groups based on the dates/times and the locations included in the set of data indicating observed occurrences;
- determines, for each of the groups, a condition for extracting data related to the series of occurrences from the set of data indicating observed occurrences, using the names, dates/times, and locations of the occurrences included in the group; and
- generates the query using the condition determined, the query being written in a predetermined format.

(Supplementary Note 5)

The information search apparatus according to Supplementary Note 3 or 4,
- wherein the query generation unit determines a layer to be used to determine the condition in the hierarchical structure constructed, and divides only a layer above the determined layer into the plurality of groups.

(Supplementary Note 6)

An information search method comprising:
- a logical inference step of executing a logical inference by applying a rule indicating a relationship between occurrences to a set of data indicating observed occurrences, and generating data of a series of occurrences through the logical inference;
- a query generation step of determining a condition for extracting data related to the series of occurrences from the set of data indicating observed occurrences based on the data of the series of occurrences and the rule indicating a relationship between occurrences, and generating a query using the condition determined; and
- a data search step of executing search processing on the set of data indicating observed occurrences using the query generated.

(Supplementary Note 7)

The information search method according to Supplementary Note 6,
- wherein the set of data indicating observed occurrences includes a name of each occurrence, and a date/time and a location where each occurrence occurred or was observed,
- the rule indicating a relationship between occurrences is constituted by a collection of sets of premises expressed as the occurrences and consequences corresponding to the premises,
- in the logical inference step, abductive inference is executed as the logical inference, and a hypothesis for the series of occurrences is generated as the data of the series of occurrences, and
- in the query generation step, the condition is determined based on the hypothesis relating to the series of occurrences as the data of the series of occurrences, the rule indicating a relationship between occurrences, and the name, the date/time, and the location of each of the occurrences.

(Supplementary Note 8)

wherein in the query generation step:

a hierarchical structure of the occurrences is constructed by setting a lowest layer as a part that expresses the observed occurrences in the hypothesis, and setting a layer of occurrences above the lowest layer by using the consequences included in the rule;

the occurrences constituting the hierarchical structure are divided into a plurality of groups based on the dates/times and the locations included in the set of data indicating observed occurrences;

for each of the groups, a condition for extracting data related to the series of occurrences from the set of data indicating observed occurrences is determined, using the names, dates/times, and locations of the occurrences included in the group; and the query is generated using the condition determined, the query being written in a predetermined format.

(Supplementary Note 9)

The information search method according to Supplementary Note 7, wherein in the query generation step:

a hierarchical structure of the occurrences is constructed from the hypothesis generated, based on hierarchical knowledge constructed in advance;

the occurrences constituting the hierarchical structure are divided into a plurality of groups based on the dates/times and the locations included in the set of data indicating observed occurrences;

for each of the groups, a condition for extracting data related to the series of occurrences from the set of data indicating observed occurrences is determined, using the names, dates/times, and locations of the occurrences included in the group; and the query is generated using the condition determined, the query being written in a predetermined format.

(Supplementary Note 10)

The information search method according to Supplementary Note 8 or 9, wherein in the query generation step, a layer to be used to determine the condition in the hierarchical structure constructed is determined, and only a layer above the determined layer is divided into the plurality of groups.

(Supplementary Note 11)

A computer-readable recording medium that includes a program recorded thereon, the program including instructions that cause a computer to carry out:

a logical inference step of executing a logical inference by applying a rule indicating a relationship between occurrences to a set of data indicating observed occurrences, and generating data of a series of occurrences through the logical inference;

a query generation step of determining a condition for extracting data related to the series of occurrences from the set of data indicating observed occurrences based on the data of the series of occurrences and the rule indicating a relationship between occurrences, and generating a query using the condition determined; and a data search step of executing search processing on the set of data indicating observed occurrences using the query generated.

(Supplementary Note 12)

The computer-readable recording medium according to Supplementary Note 11, wherein the set of data indicating observed occurrences includes a name of each occurrence, and a date/time and a location where each occurrence occurred or was observed, the rule indicating a relationship between occurrences is constituted by a collection of sets of premises expressed as the occurrences and consequences corresponding to the premises, in the logical inference step, abductive inference is executed as the logical inference, and a hypothesis for the series of occurrences is generated as the data of the series of occurrences, and in the query generation step, the condition is determined based on the hypothesis relating to the series of occurrences as the data of the series of occurrences, the rule indicating a relationship between occurrences, and the name, the date/time, and the location of each of the occurrences.

(Supplementary Note 13)

The computer-readable recording medium according to Supplementary Note 12, wherein in the query generation step:

a hierarchical structure of the occurrences is constructed by setting a lowest layer as a part that expresses the observed occurrences in the hypothesis, and setting a layer of occurrences above the lowest layer by using the consequences included in the rule;

the occurrences constituting the hierarchical structure are divided into a plurality of groups based on the dates/times and the locations included in the set of data indicating observed occurrences;

for each of the groups, a condition for extracting data related to the series of occurrences from the set of data indicating observed occurrences is determined, using the names, dates/times, and locations of the occurrences included in the group; and the query is generated using the condition determined, the query being written in a predetermined format.

(Supplementary Note 14)

The computer-readable recording medium according to Supplementary Note 12, wherein in the query generation step:

a hierarchical structure of the occurrences is constructed from the hypothesis generated, based on hierarchical knowledge constructed in advance;

the occurrences constituting the hierarchical structure are divided into a plurality of groups based on the dates/times and the locations included in the set of data indicating observed occurrences;

for each of the groups, a condition for extracting data related to the series of occurrences from the set of data indicating observed occurrences is determined, using the names, dates/times, and locations of the occurrences included in the group; and the query is generated using the condition determined, the query being written in a predetermined format.

(Supplementary Note 15)

The computer-readable recording medium according to Supplementary Note 13 or 14, wherein in the query generation step, a layer to be used to determine the condition in the hierarchical structure constructed is determined, and only a layer above the determined layer is divided into the plurality of groups.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

As described above, according to the present invention, it is possible to exhaustively extract data related to a series of occurrences from a data set having potential relationships with each other. The present invention is useful for various search systems.

REFERENCE SIGNS LIST

10 Logical inference unit
20 Query generation unit
21 Hierarchization unit
22 Constraint condition determination unit
23 Query output unit
24 Constraint range determination unit
30 Data search unit
40 Observed occurrence data storage unit
50 Knowledge storage unit
60 Display unit
100 Information search apparatus (first example embodiment)
101 Information search apparatus (second example embodiment)
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An information search apparatus comprising:
at least one memory storing instructions; and
at least one processor configured to execute the instructions to:
execute a logical inference by applying a rule indicating a relationship between occurrences to a set of data indicating observed occurrences, and generate data of a series of occurrences through the logical inference;
construct a hierarchical structure of the occurrences;
divide the occurrences constituting the hierarchical structure into a plurality of groups based on names, dates, times, and locations included in the set of data indicating the observed occurrences;
determine, for each group, a condition for extracting data related to the series of occurrences from the set of data indicating the observed occurrences, using the names, dates, times, and locations of the occurrences included in the each group; and
generate a query using the determined condition for each group, the query written in a predetermined format; and
execute search processing on the set of data indicating observed occurrences using the query generated.

2. The information search apparatus according to claim 1, wherein the rule is constituted by a collection of sets of premises expressed as the occurrences and consequences corresponding to the premises, and
wherein the at least one processor is configured to execute the instructions to further:
execute abductive inference as the logical inference and generate a hypothesis for the series of occurrences as the data of the series of occurrences; and
determine, for each group, the condition based on the hypothesis relating to the series of occurrences as the data of the series of occurrences, the rule indicating a relationship between the occurrences, and the names, dates, times, and locations of the occurrences.

3. The information search apparatus according to claim 2, wherein the at least one processor is configured to execute the instructions to further:
construct the hierarchical structure of the occurrences by setting a lowest layer of the occurrences as a part that expresses the observed occurrences in the hypothesis, and setting a layer of the occurrences above the lowest layer by using the consequences included in the rule.

4. The information search apparatus according to claim 2, wherein the at least one processor is configured to execute the instructions to further:
construct the hierarchical structure of the occurrences from the hypothesis-generated, based on hierarchical knowledge constructed in advance.

5. The information search apparatus according to claim 3, wherein the at least one processor is configured to execute the instructions to further:
determine a layer to be used to determine the condition in the hierarchical structure; and
divide the determined layer and a layer above the determined layer into the plurality of groups.

6. An information search method performed by a computer and comprising:
executing a logical inference by applying a rule indicating a relationship between occurrences to a set of data indicating observed occurrences, and generating data of a series of occurrences through the logical inference;
constructing a hierarchical structure of the occurrences;
dividing the occurrences constituting the hierarchical structure into a plurality of groups based on names, dates, times, and locations included in the set of data indicating the observed occurrences;
determining, for each group, a condition for extracting data related to the series of occurrences from the set of data indicating the observed occurrences, using the names, dates, times, and locations of the occurrences included in the each group; and
generating a query using the determined condition for each group, the query written in a predetermined format; and
executing search processing on the set of data indicating observed occurrences using the query generated.

7. The information search method according to claim 6, wherein the rule is constituted by a collection of sets of premises expressed as the occurrences and consequences corresponding to the premises, and the method further comprises:
executing abductive inference as the logical inference, and generating a hypothesis for the series of occurrences as the data of the series of occurrences; and determining, for each group, the condition based on the hypothesis relating to the series of occurrences as the data of the series of occurrences, the rule indicating a relationship between the occurrences, and the names, dates, times, and locations of the occurrences.

8. The information search method according to claim 7, wherein the method further comprises:
constructing the hierarchical structure of the occurrences is constructed by setting a lowest layer of the occurrences as a part that expresses the observed occurrences in the hypothesis, and setting a layer of the occurrences above the lowest layer by using the consequences included in the rule.

9. The information search method according to claim 7, wherein the method further comprises:
constructing the hierarchical structure of the occurrences is constructed from the hypothesis generated, based on hierarchical knowledge constructed in advance.

10. The information search method according to claim 8, wherein the method further comprises:
determining a layer to be used to determine the condition in the hierarchical structure; and
dividing the determined layer and a layer above the divided layer into the plurality of groups.

11. A non-transitory computer-readable recording medium storing a program including instructions that cause a computer to perform processing comprising:
executing a logical inference by applying a rule indicating a relationship between occurrences to a set of data indicating observed occurrences, and generating data of a series of occurrences through the logical inference;
constructing a hierarchical structure of the occurrences;
dividing the occurrences constituting the hierarchical structure into a plurality of groups based on names, dates, times, and locations included in the set of data indicating the observed occurrences;
determining, for each group, a condition for extracting data related to the series of occurrences from the set of data indicating the observed occurrences, using the names, dates, times, and locations of the occurrences included in the each group; and
generating a query using the determined condition for each group, the query written in a predetermined format; and
executing search processing on the set of data indicating observed occurrences using the query generated.

12. The non-transitory computer-readable recording medium according to claim 11,
wherein the rule is constituted by a collection of sets of premises expressed as the occurrences and consequences corresponding to the premises, and the processing further comprises:
executing abductive inference as the logical inference, and generating a hypothesis for the series of occurrences as the data of the series of occurrences; and
determining, for each group, the condition based on the hypothesis relating to the series of occurrences as the data of the series of occurrences, the rule indicating a relationship between the occurrences, and the names, dates, times, and locations of the occurrences.

13. The non-transitory computer-readable recording medium according to claim 12,
wherein the processing further comprises:
constructing the hierarchical structure of the occurrences is constructed by setting a lowest layer of the occurrences as a part that expresses the observed occurrences in the hypothesis, and setting a layer of the occurrences above the lowest layer by using the consequences included in the rule.

14. The non-transitory computer-readable recording medium according to claim 12,
wherein the processing further comprises:
constructing the hierarchical structure of the occurrences is constructed from the hypothesis, based on hierarchical knowledge constructed in advance.

15. The non-transitory computer-readable recording medium according to claim 13,
wherein the method further comprises:
determining a layer to be used to determine the condition in the hierarchical structure; and
dividing the determined layer and a layer above the divided layer into the plurality of groups.

* * * * *